(12) United States Patent
Kuwabara

(10) Patent No.: US 10,647,371 B2
(45) Date of Patent: May 12, 2020

(54) HANDLE LOCK STRUCTURE FOR SADDLED VEHICLE

(71) Applicant: HONDA MOTOR CO., LTD., Tokyo (JP)

(72) Inventor: Naoki Kuwabara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 15/757,190

(22) PCT Filed: Aug. 3, 2016

(86) PCT No.: PCT/JP2016/072741
§ 371 (c)(1),
(2) Date: Mar. 2, 2018

(87) PCT Pub. No.: WO2017/051613
PCT Pub. Date: Mar. 30, 2017

(65) Prior Publication Data
US 2018/0304946 A1 Oct. 25, 2018

(30) Foreign Application Priority Data
Sep. 25, 2015 (JP) ................................. 2015-188660

(51) Int. Cl.
*B62H 5/04* (2006.01)
*B62K 25/24* (2006.01)
(Continued)

(52) U.S. Cl.
CPC ................ *B62H 5/04* (2013.01); *B62H 5/06* (2013.01); *B62K 21/04* (2013.01); *B62K 25/24* (2013.01)

(58) Field of Classification Search
CPC . B62H 5/04; B62H 5/06; B62K 21/04; B62K 25/24
(Continued)

(56) References Cited

U.S. PATENT DOCUMENTS

| 8,141,892 B2* | 3/2012 | Nakanishi ............... B62H 5/02 180/219 |
| 2008/0236216 A1* | 10/2008 | Takeuchi .......... B60R 25/02113 70/207 |
| 2010/0223967 A1* | 9/2010 | Nakanishi ............... B62H 5/02 70/233 |

FOREIGN PATENT DOCUMENTS

| JP | S58-181656 U | 12/1983 |
| JP | S64-52588 A | 2/1989 |

(Continued)

OTHER PUBLICATIONS

Japanese Office Action dated Feb. 5, 2019 with English translation, 10 pages.
(Continued)

*Primary Examiner* — Suzanne L Barrett
(74) *Attorney, Agent, or Firm* — Rankin, Hill & Clark LLP

(57) ABSTRACT

An electric handle lock structure for a saddled vehicle which can provide a compact arrangement around a handle to thereby achieve miniaturization of a vehicle body front portion. A handle lock structure for a saddled vehicle includes: a handle steering shaft operated by a handle; a front wheel steering shaft disposed to steer a front wheel in front of the handle steering shaft; a top bridge which is fastened to an upper end of the handle steering shaft and to which the handle is fixed; and an electric handle lock device that is electrically operated and is provided between the handle steering shaft and the front wheel steering shaft in the proximity of the handle, and the electric handle lock device
(Continued)

is disposed so that at least part thereof overlaps below the top bridge in a plan view.

12 Claims, 12 Drawing Sheets

(51) Int. Cl.
  *B62H 5/06* (2006.01)
  *B62K 21/04* (2006.01)
(58) Field of Classification Search
  USPC .................................................. 70/233
  See application file for complete search history.

(56) References Cited

FOREIGN PATENT DOCUMENTS

| | | |
|---|---|---|
| JP | 2010-215110 A | 9/2010 |
| JP | 2012-51423 A | 3/2012 |
| JP | 5656924 | 1/2015 |
| TW | I221497 | 10/2004 |
| TW | I221497 | 10/2004 |
| TW | I373425 | 10/2012 |
| TW | I373425 | 10/2012 |
| WO | 98/28183 A1 | 7/1998 |

OTHER PUBLICATIONS

International Preliminary Report on Patentability (Chapter II), dated Mar. 29, 2018 (dated Mar. 29, 2018), 5 pages.
International Preliminary Examination Report, dated Apr. 4, 2017, 3 pages.
European Search Report dated Sep. 18, 2018, 8 pages.
International Search Report, dated Oct. 18, 2016 (dated Oct. 18, 2016), 2 pages.
Taiwan Office Action, dated Jul. 25, 2017, 5 pages.
Taiwan Office Action, dated Nov. 17, 2017, 4 pages.
International Preliminary Examination Report, dated Apr. 4, 2014, 3 pages.

* cited by examiner

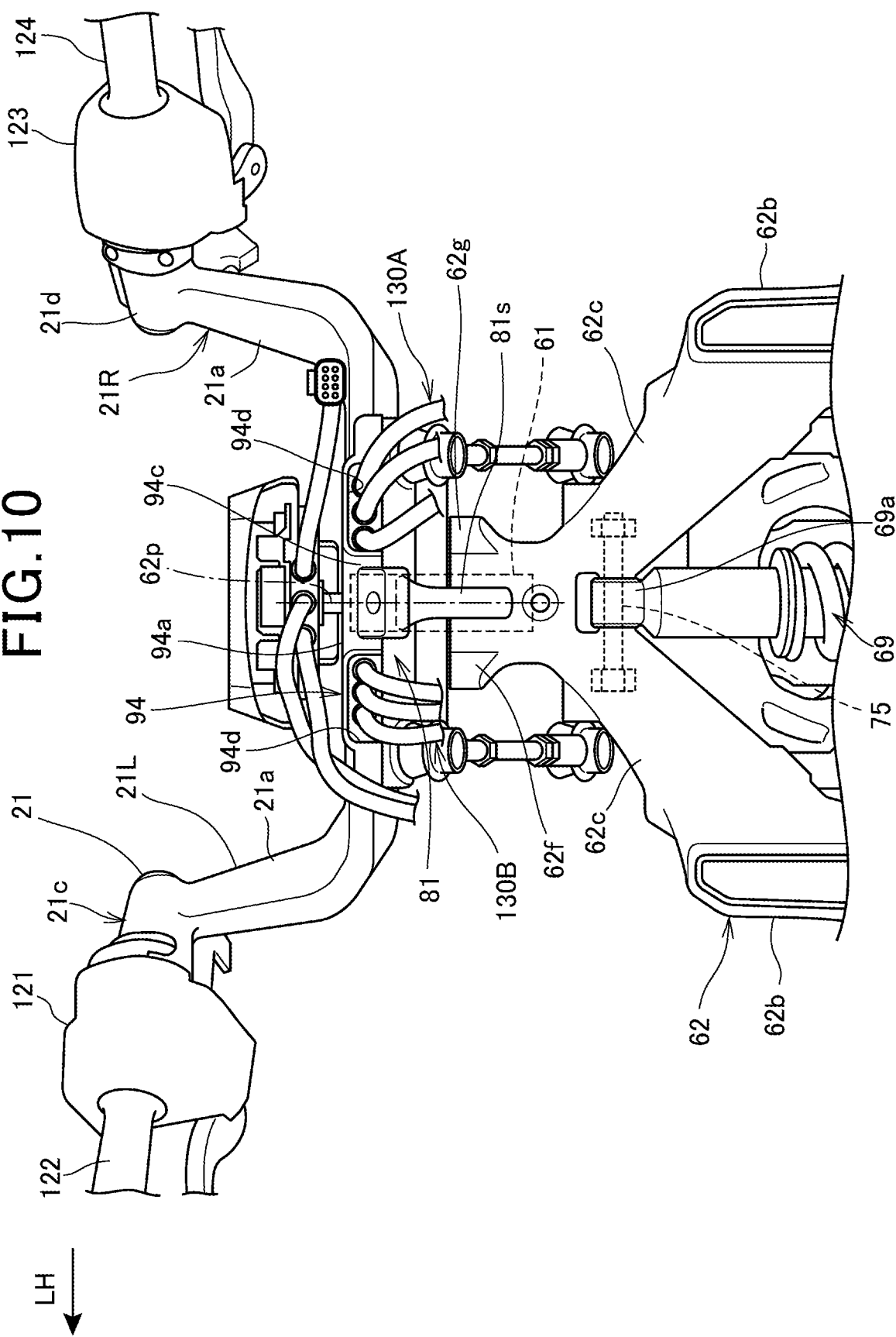

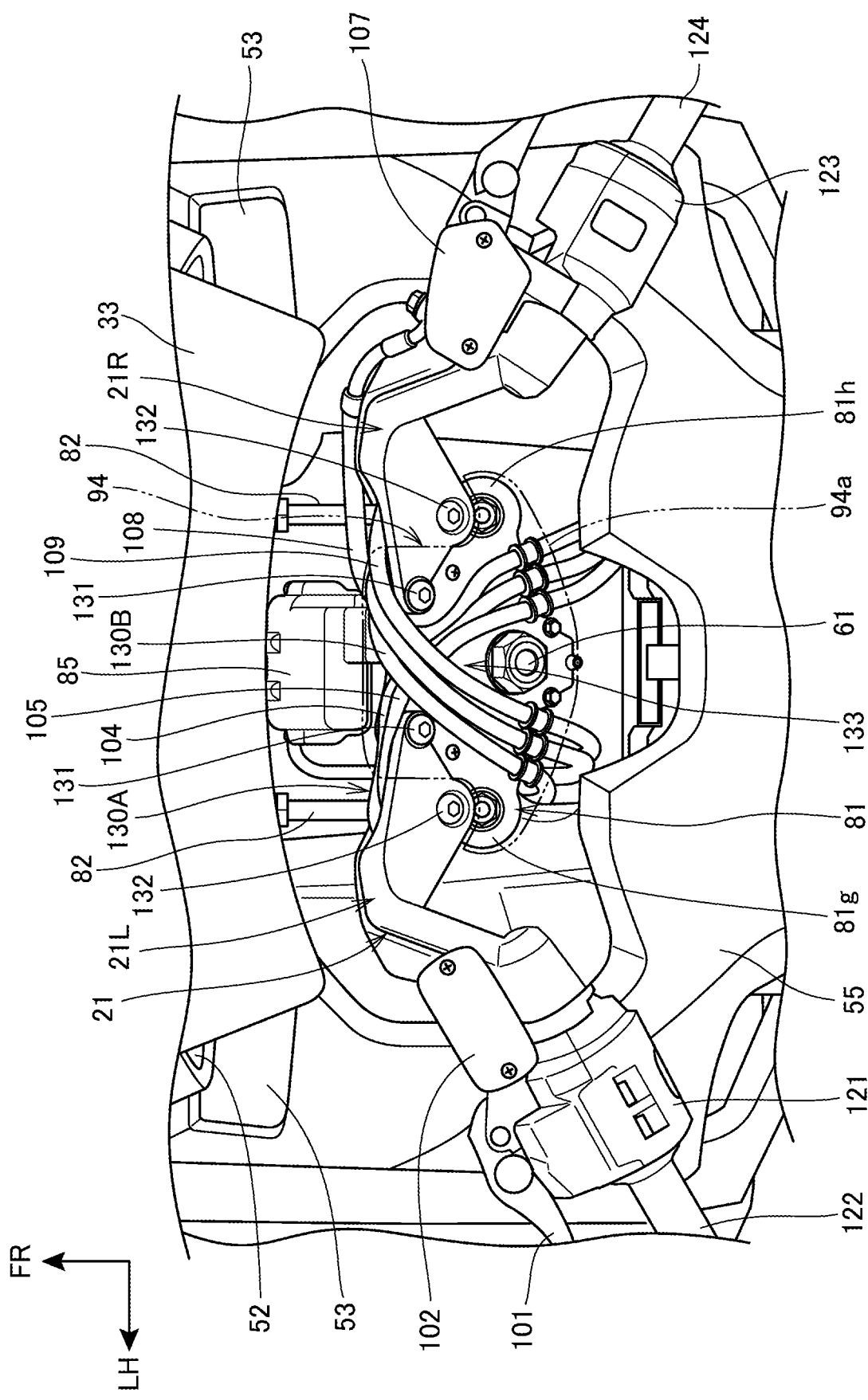

HANDLE LOCK STRUCTURE FOR SADDLED VEHICLE

TECHNICAL FIELD

The present invention relates to a handle lock structure for a saddled vehicle.

BACKGROUND ART

There has conventionally been known a structure of disposing an anti-theft device that is an electrical component at a front lower portion of a top bridge and can wirelessly transmit positional information (for example, see Patent Literature 1).

CITATION LIST

Patent Literature

Patent Literature 1: Japanese Patent No. 5656924

SUMMARY OF INVENTION

Technical Problem

When an anti-theft device that electrically performs a handle lock is provided around a handle, the anti-theft device must be disposed in the proximity of the handle. However, since many electrical components, harnesses of the electrical components, various cables, various pipes, and the like are disposed around the handle, it is desired to provide a compact arrangement around the handle to thereby achieve miniaturization of a vehicle body front portion.

It is an object of the present invention to provide an electric handle lock structure for a saddled vehicle which can provide a compact arrangement around a handle to thereby achieve miniaturization of a vehicle body front portion.

Solution to Problem

This specification contains the entire contents of Japanese patent application filed on Sep. 25, 2015 (Japanese Patent Application No. 2015-188660).

To solve the above-described problems, the present invention provides a handle lock structure for a saddled vehicle including: a handle steering shaft (61) operated by a handle (21); a front wheel steering shaft (12a) disposed to steer a front wheel (13) in front of the handle steering shaft (61); a top bridge (81) which is fastened to an upper end of the handle steering shaft (61) and to which the handle (21) is fixed; and an electric handle lock device (85) that is electrically operated and is provided in the proximity of the handle (21), wherein the electric handle lock device (85) is provided between the handle steering shaft (61) and the front wheel steering shaft (12a), and the electric handle lock device (85) is disposed so that at least part thereof overlaps below the top bridge (81) in a plan view.

In the above-described configuration, the front wheel steering shaft (12a) may be coupled to the handle steering shaft (61) through a pair of left and right link members (82) that are coupled to the top bridge (81), and the electric handle lock device (85) may be disposed between the pair of left and right link members (82) so as to overlap with the pair of left and right link members (82) in a side view.

In the above-described configuration, a steering shaft upper arm (83) may be provided at an upper end portion of the front wheel steering shaft (12a), and both end portions of the steering shaft upper arm (83) may be coupled to the pair of left and right link members (82), respectively, so that the electric handle lock device (85) is disposed behind the steering shaft upper arm (83).

In the above-described configuration, the electric handle lock device (85) may be provided with a lock part (116) that is engaged with a bottom surface of the top bridge (81) to be capable of restricting turning of the handle (21).

In the above-described configuration, the lock part (116) may be engageable with a recess portion (81c) that is formed on the bottom surface of the top bridge (81).

In the above-described configuration, a main frame (62) may be provided to turnably support the handle steering shaft (61), and the electric handle lock device (85) may be supported on an upper portion of the main frame (62) and may be disposed to come closer to a front of the main frame (62).

In the above-described configuration, the main frame (62) includes restricting portions (62f, 62g) that restrict a turning angle of the handle (21), and support portions (62e, 62e) that support the electric handle lock device (85), and the restricting portions (62f, 62g) may be provided in an opposite side to the support portions (62e, 62e) with respect to the handle steering shaft (61).

In the above-described configuration, the restricting portions (62f, 62g) may be integrally formed with the main frame (62).

In the above-described configuration, long components (130A, 130B) that is connected to components attached to the handle (21) may cross to form an X-shape on a top surface of the top bridge (81), and the long components (130A, 130B) may be fixed to the top bridge (81).

In the above-described configuration, a cushion unit (69) may be disposed below the electric handle lock device (85) so that an upper end portion thereof is supported on the main frame (62).

Advantageous Effects of Invention

In the present invention, the electric handle lock device is provided between the handle steering shaft and the front wheel steering shaft, and the electric handle lock device is disposed so that at least part thereof overlaps below the top bridge in a plan view, thereby enabling the electric handle lock device to be disposed to come closer to a handle steering shaft side in a space between the handle steering shaft and the front wheel steering shaft that are disposed in a front-rear direction and a space below the top bridge. Therefore, a compact arrangement around a handle, more particularly, around the top bridge can be provided to thereby achieve miniaturization of a vehicle body front portion.

The front wheel steering shaft is coupled to the handle steering shaft through a pair of left and right link members that are coupled to the top bridge, and the electric handle lock device is disposed between the pair of left and right link members so as to overlap with the pair of left and right link members in a side view, thereby enabling a space between the pair of left and right link members to be effectively utilized with the electric handle lock device being disposed in the space. Therefore, the electric handle lock device can be disposed intensively around the handle, thereby capable of providing a compact arrangement around the handle. In addition, the electric handle lock device can be protected from their sides by the left and right link members.

The steering shaft upper arm is provided at an upper end portion of the front wheel steering shaft, both end portions of the steering shaft upper arm are coupled to the pair of left and right link members, respectively, and the electric handle lock device is disposed behind the steering shaft upper arm, thereby enabling a space in front of the main frame and behind the steering shaft upper arm to be effectively utilized with the electric handle lock device being disposed in the space, and capable of protecting the electric handle lock device.

Since the electric handle lock device is provided with a lock part that is engaged with a bottom surface of the top bridge to be capable of restricting turning of the handle, the lock part is engaged with the top bridge to restrict a turning position of the handle, thereby capable of increasing the degree of freedom of arrangement of the electric handle lock device in the present invention as compared with a conventional handle lock device whose arrangement is restricted to around a head pipe.

The lock part can be engaged with a recess portion that is formed on the bottom surface of the top bridge, thereby enabling the electric handle lock device to be disposed to come closer from the lower side to the top bridge. Accordingly, the electric handle lock device can be disposed intensively around the top bridge, thereby capable of providing a compact arrangement around the handle.

The main frame turnably supports the handle steering shaft, and the electric handle lock device is supported on an upper portion of the main frame, and disposed to come closer to a front of the main frame, thereby capable of efficiently utilizing a space formed below the top bridge and in front of the main frame to dispose the electric handle lock device, and providing a compact arrangement around the top bridge.

The main frame is provided with a restricting portion for restricting a turning angle, and a support portion for supporting the electric handle lock device, the restricting portion is provided in an opposite side to the support portion with respect to the handle steering shaft, so that the support portion and the restricting portion can be disposed to come closer to the handle steering shaft, thereby capable of being disposed intensively around the handle and providing a compact arrangement around the handle.

The restricting portion is integrally formed with the main frame, thereby capable of reducing the number of components and the cost.

Since the long components that are connected to components attached to the handle cross to form an X-shape on a top surface of the top bridge, and the long components are fixed to the top bridge, the long components are disposed on the top surface of the top bridge, thereby capable of effectively utilizing a space close to the top bridge. Accordingly, the components can be disposed intensively around the handle, thereby capable of providing a compact arrangement around the handle. The long components cross to form an X-shape, so that the curvature radius of bend of the long components can be greater. Therefore, the long components can be reasonably disposed, so that the long components can be hard to deteriorate.

The cushion unit the upper end portion of which is supported on the main frame is disposed below the electric handle lock device, thereby capable of protecting the electric handle lock device by the cushion unit from below.

BRIEF DESCRIPTION OF DRAWINGS

FIGS. 6A and 6B each are an explanatory diagram illustrating a top bridge, in which FIG. 6A is a plan view illustrating the top bridge, and FIG. 6B is an elevational view illustrating the top bridge.

FIGS. 9A and 9B each are an explanatory diagram illustrating an electric handle lock device, in which FIG. 9A is a left side elevational view illustrating the top bridge and the electric handle lock device, and FIG. 9B is a plan view illustrating the electric handle lock device.

FIG. 10 is a diagram as viewed from an arrow direction of X of FIG. 5.

FIG. 11 is a plan view of a main part illustrating the bar handle and the periphery thereof.

DESCRIPTION OF EMBODIMENT

Hereinafter, an embodiment of the present invention will be described with reference to the drawings. It is to be noted that, unless otherwise specified, the directions such as forward, backward, leftward, rightward, upward, and downward directions in the following description are the same as those with regard to a vehicle body. Further, in the figures, an arrow mark FR represents the forward direction of the vehicle body, an arrow mark UP represents the upward direction of the vehicle body, and an arrow mark LH represents the leftward direction of the vehicle body.

Figure 1:
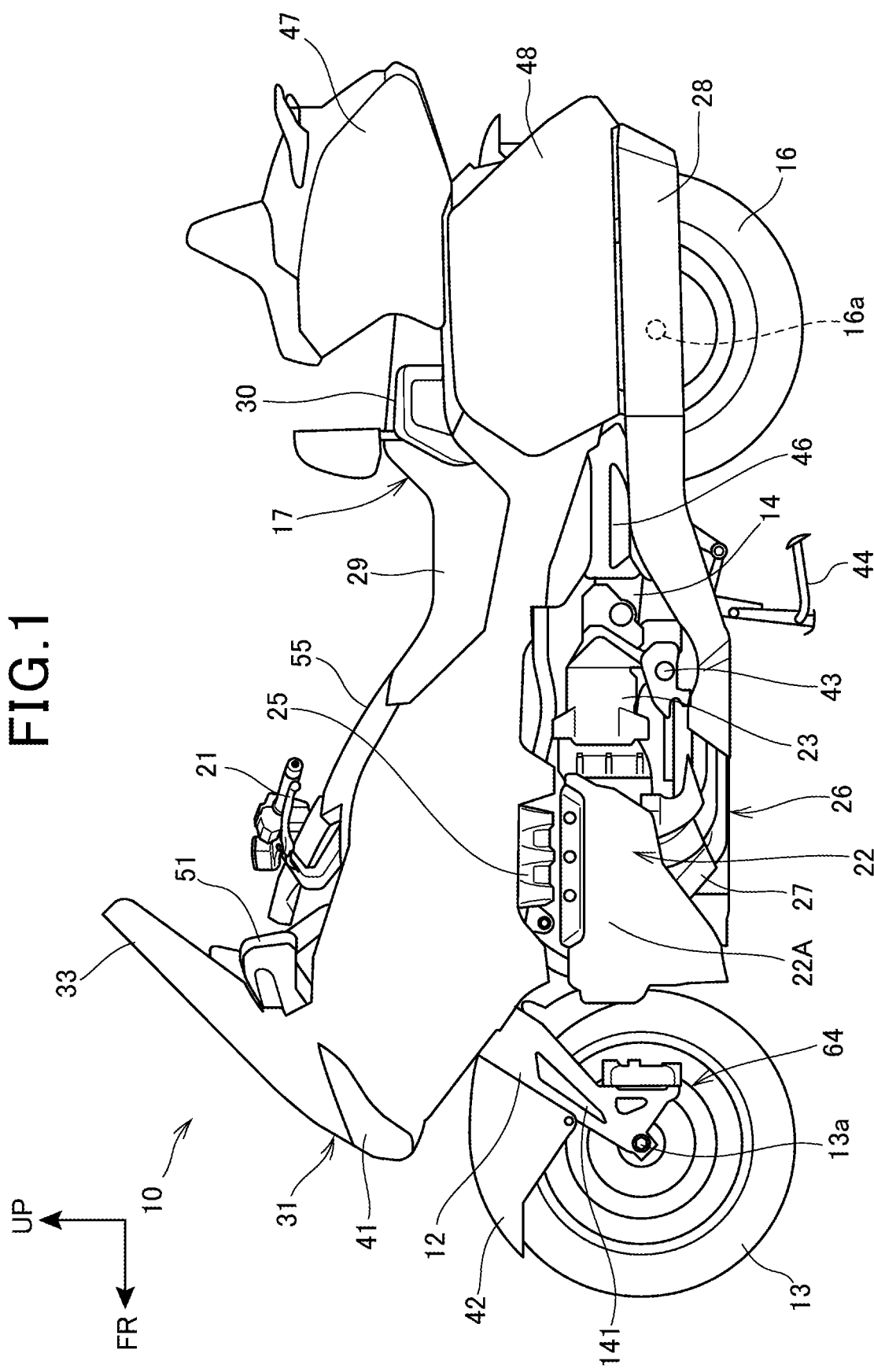
FIG. 1 is a left side elevational view illustrating a motorcycle provided with a handle lock structure according to the present invention.

FIG. 1 is a left side elevational view illustrating a motorcycle 10 provided with a handle lock structure according to the present invention.

The motorcycle 10 is a saddled vehicle that includes a front wheel 13 supported on a front portion of a vehicle body frame 11 (see FIG. 3) through a front swing arm 12, a rear wheel 16 supported on a lower portion of the vehicle body frame 11 through a rear swing arm 14, and a seat 17 provided at an upper portion of the vehicle body.

The front swing arm 12 is steered by the handle 21 provided at the upper portion of the vehicle body.

An engine 22 supported by the vehicle body frame 11 is mounted behind the front wheel 13, and a transmission 23 is integrally provided at a rear portion of the engine 22.

The front wheel 13 is supported on the front swing arm 12 through a wheel shaft 13a, and the rear wheel 16 is supported on the rear swing arm 14 through a wheel shaft 16a.

The engine 22 is a horizontal opposed type engine in which cylinder parts 22A protrude from a crankcase (not illustrated) provided at a center portion in a vehicle width direction toward left and right sides, respectively. An intake device 25 is connected to an upper portion of the cylinder part 22A, and an exhaust device 26 is connected to a lower portion of the cylinder part 22A.

The exhaust device 26 includes a plurality of exhaust pipes 27 that extend downwardly and backwardly from the cylinder part 22A, and a muffler 28 that is connected to rear end portions of the exhaust pipes 27.

The transmission 23 is provided with an output shaft (not illustrated) at a rear portion of the transmission 23, and a drive shaft (not illustrated) extends from the output shaft to the rear wheel 16 so that power is transmitted from the transmission 23 to the rear wheel 16 through the drive shaft.

A driver's seat 29 and a passenger's seat 30 constituting a seat 7 are disposed backwardly and obliquely downwardly from the handle 21. A front portion and both side portions of the motorcycle 10 are covered with a vehicle body cover 31.

Reference numeral 41 in the figure denotes a headlight, reference numeral 42 denotes a front fender that covers the front wheel 13 from above, reference numeral 43 denotes a driver step, reference numeral 44 denotes a main stand, reference numeral 46 denotes a passenger step, reference numeral 47 denotes a trunk box, reference numeral 48 denotes a saddlebag, and reference numeral 141 denotes a reflector that is attached to a side surface of a front swing arm 12.

Figure 2:
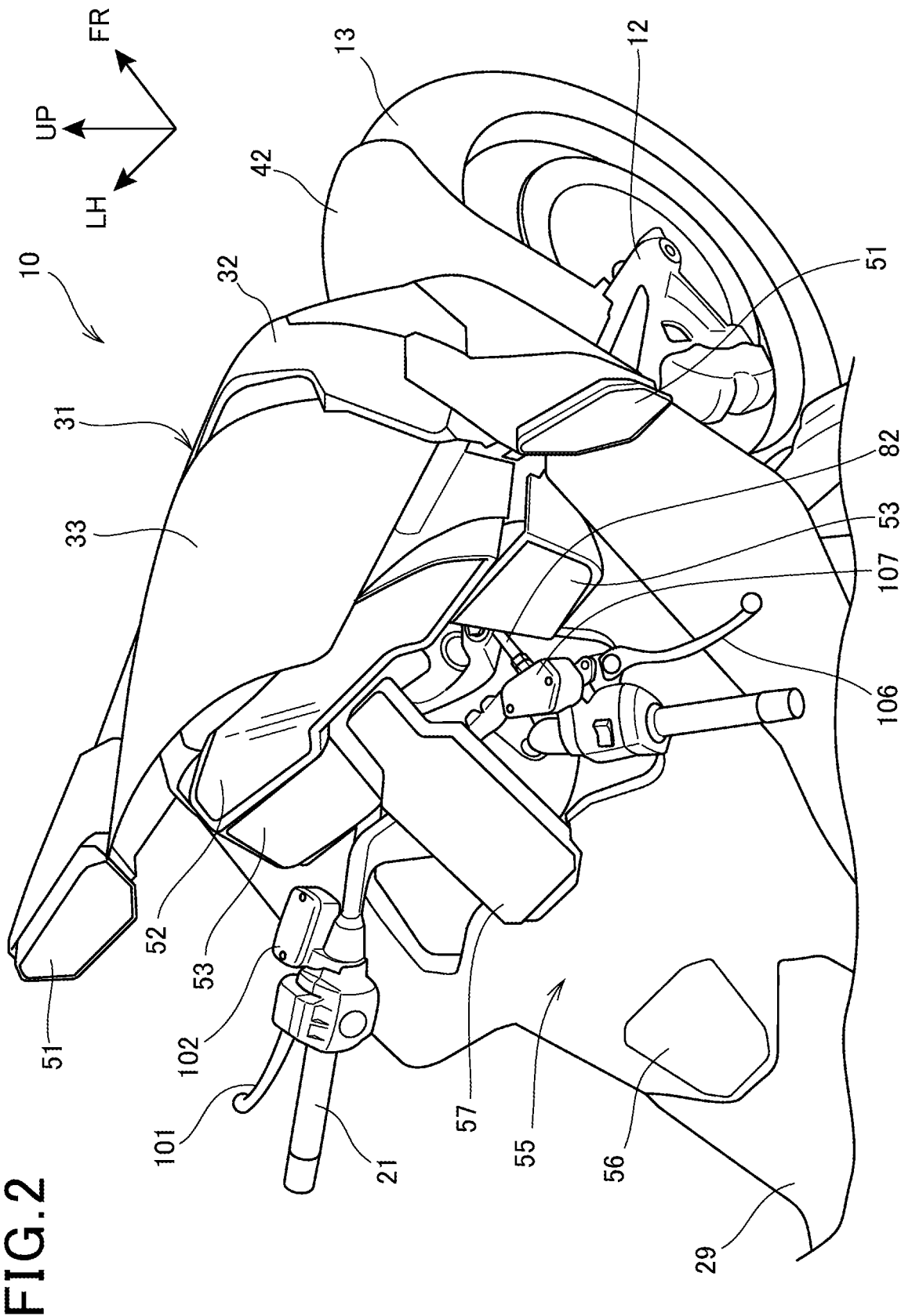
FIG. 2 is a perspective view illustrating a vehicle body front portion of the motorcycle as viewed from obliquely above.

FIG. 2 is a perspective view illustrating a vehicle body front portion of the motorcycle 10 as viewed from obliquely above.

A front cover 32 and a windscreen 33 provided at the upper portion of the front cover 32 that constitute the vehicle body cover 31, rear-view mirrors 51, 51 provided at both side portions of the front cover 32 are disposed in the vehicle body front portion of the motorcycle 10.

A meter panel 52, and a pair of left and right speakers 53, 53 are disposed on a rear side of the windscreen 33. The handle 21 is disposed behind of the windscreen 33.

The handle 21 is coupled to the handle steering shaft (not illustrated) supported on the vehicle body frame 11. The handle steering shaft is further coupled to the front wheel steering shaft (not illustrated) that is a turning shaft of the front swing arm 12 so that the handle steering shaft is turned along with the turning operation of the handle 21, and the front wheel steering shaft is also turned, to thereby steer the front wheel 13.

A tank cover 55 that covers a fuel tank (not illustrated) is provided below the handle 21. The tank cover 55 is provided with a fuel lid 56 that openably covers above a fuel feeding port of the fuel tank, and an operation panel 57 that sets information displayed on the meter panel 52.

Figure 3:
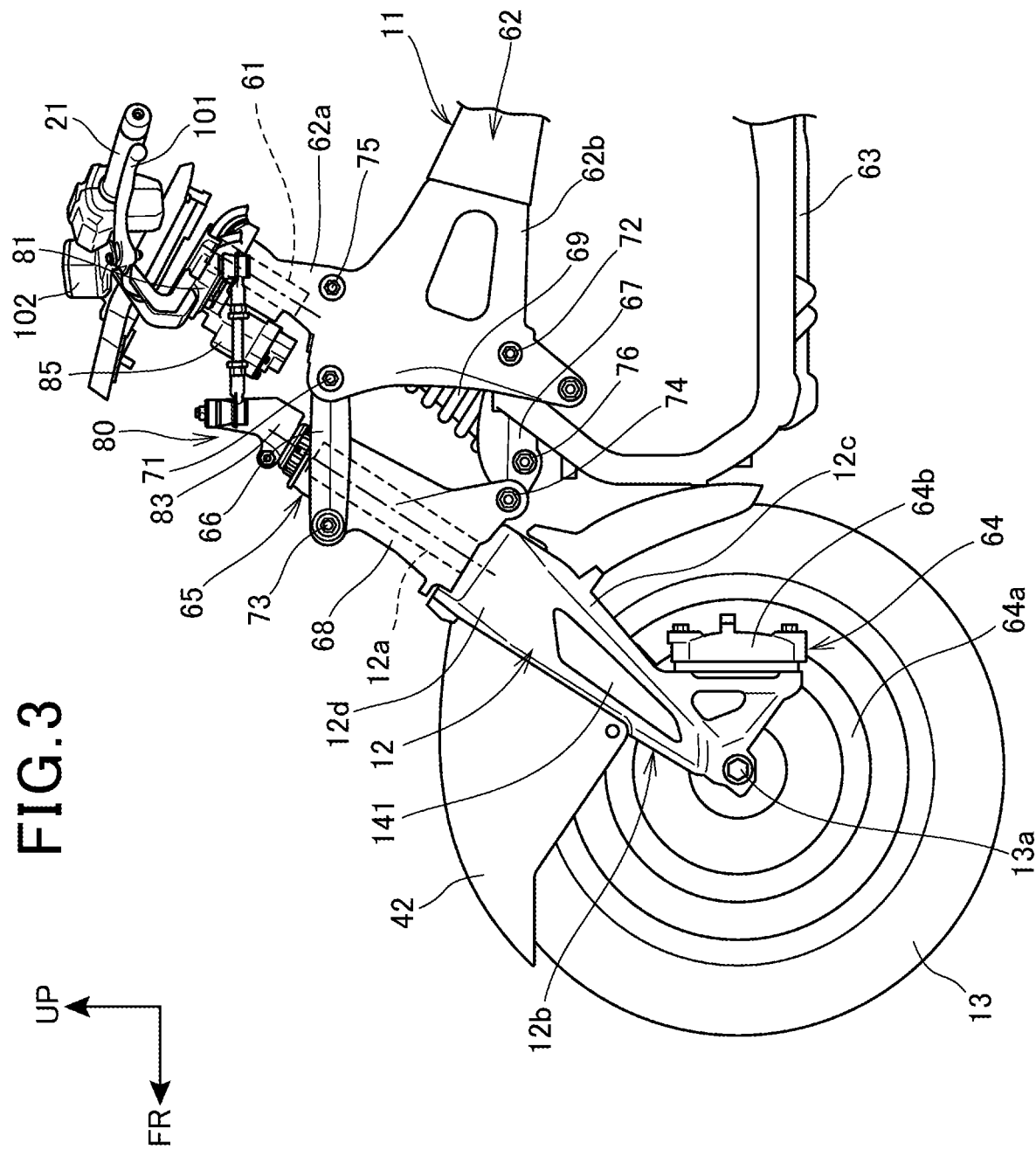
FIG. 3 is a left side elevational view illustrating the vehicle body front portion of the motorcycle.

FIG. 3 is a left side elevational view illustrating the vehicle body front portion of the motorcycle 10 in which part of the vehicle body frame 11 and a front suspension mechanism 65 are illustrated with the vehicle body cover and the engine removed.

The vehicle body frame 11 is provided with a main frame 62 that turnably supports the handle steering shaft 61 to be turned by the handle 21, and a lower frame 63 that is attached to a front lower portion of the main frame 62.

The front wheel 13 is braked by a front wheel disc brake device 64. The front wheel disc brake device 64 includes a brake disc 64a that is integrally provided at the front wheel 13, and a brake caliper 64b that is attached to a lower end portion and a rear portion of the front swing arm 12 to brake the brake disc 64a.

The front suspension mechanism 65 is supported on a front portion of the main frame 62.

The front suspension mechanism 65 includes an upper link 66, a lower link 67, a fork support part 68, a front swing arm 12, and a front cushion unit 69.

The upper link 66 and the lower link 67 are disposed at an upper portion and a lower portion of the front portion of the main frame 62, respectively, and are supported through support shafts 71, 72, respectively, on the main frame 62 in a vertically swingable manner. The upper link 66 and the lower link 67 are disposed to extend in the front-rear direction, respectively and to be parallel to each other.

The upper link 66 is turnably coupled to a front upper portion of the cylindrical fork support part 68 through a support shaft 73, and the lower link 67 is turnably supported on a rear lower portion of the fork support part 68 through a support shaft 74.

Thus, the fork support part 68 is provided with the support shaft 73 at the front upper portion thereof and with the support shaft 74 at the rear lower portion, thereby capable of disposing the support shafts 73, 74 in the vertical direction. As a result, when a distance between fulcrums of the upper link 66 and the lower link 67 is the same, the front lower portion of the main frame 62 is not required to protrude greatly in a forward direction, thereby capable of miniaturizing the main frame 62.

The front swing arm 12 includes a front wheel steering shaft 12a that is turnably supported on the fork support part 68, and a fork portion 12b that is integrally connected to the lower end portion of the front wheel steering shaft 12a.

The front wheel steering shaft 12a is inserted into a fork shaft insertion hole 68d (see FIG. 12) that is formed in the fork support part 68 to thereby be turnably supported on the fork support part 68.

The fork portion 12b is integrally formed with a pair of left and right arm parts 12c that have lower end portions to which the wheel shaft 13a is attached, and a cross portion 12d that connects the upper end portions of the left and right arm parts 12c.

The front wheel steering shaft 12a is attached to the cross portion 12d. The wheel shaft 13a turnably supports the front wheel 13.

An upper end portion of the front cushion unit 69 is supported on the main frame 62 through a support shaft 75 in a swingable manner, and a lower end portion thereof is supported on a lower link 67 through a support shaft 76 in a swingable manner.

The front wheel 13 is steered by a steering mechanism 80 including the handle 21.

Figure 4:
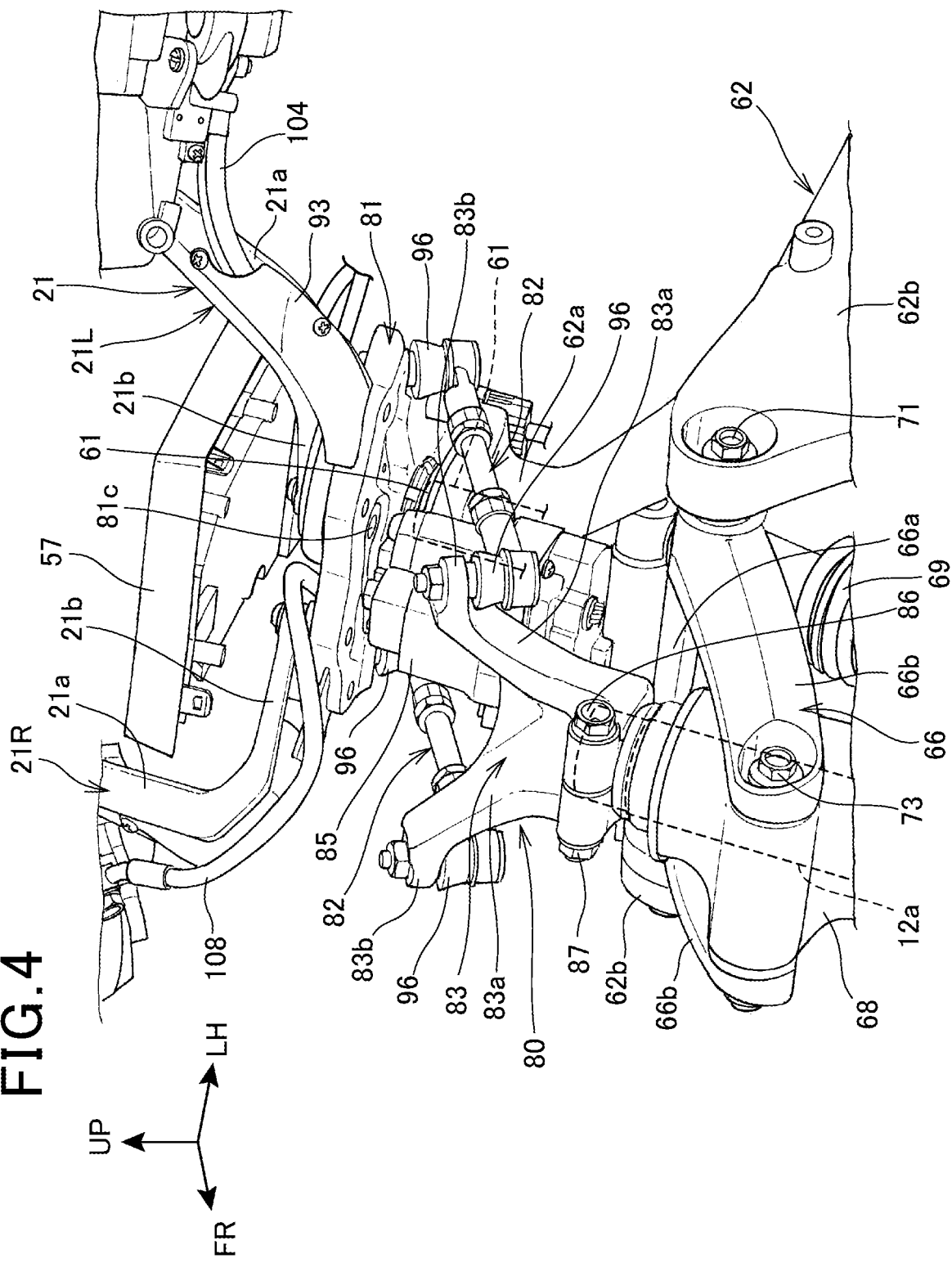
FIG. 4 is a perspective view illustrating a bar handle and the periphery thereof as viewed obliquely from front.

FIG. 4 is a perspective view illustrating the handle 21 and the periphery thereof as viewed obliquely from front.

The handle 21 includes a pair of left and right independent handle half bodies 21L, 21R, and is fixed to the top bridge 81 that is attached to an upper end portion of the handle steering shaft 61.

The handle half bodies 21L, 21R each include: an inclined portion 21a that extends from a grip at a corresponding left or right end portion (a handle grip 122 and a throttle grip 124 illustrated in FIG. 10) while inclined toward an inner side in the vehicle width direction; and a horizontal portion 21b that extends substantially horizontally from an inner end portion of the inclined portion 21a, the inclined portion 21a being integrally formed with the horizontal portion 21b, and the horizontal portion 21b is attached to the top bridge 81. The inclined portion 21a and the horizontal portion 21b are formed in a nearly plate shape.

The upper link 66 includes a link center portion 66a that extends in the vehicle width direction and through which the support shaft 71 passes, and link side portions 66b, 66b that extend forwardly from both end portions of the link center portion 66a so that the link center portion 66a and the link side portions 66b, 66b are integrally formed in a U-shape in a plan view, and each front end portion of the link side portions 66b, 66b is coupled to the fork support part 68 through the support shaft 73.

The steering mechanism 80 includes the handle 21, the top bridge 81, a pair of left and right rods 82, 82 that are coupled to both end portions of the top bridge 81 and extend forwardly, a steering shaft upper arm 83 that is coupled to a front end portion of the rod 82 and is attached to an upper end portion of the front wheel steering shaft 12a, and a front swing arm 12 (see FIG. 3).

The main frame 62 is integrally formed with the cylindrical handle shaft support portion 62a that protrudes upwardly toward an upper portion of the front end portion, and the top bridge 81 is disposed above the handle shaft support portion 62a.

An electric handle lock (ESL: Electric Handle lock) device 85 that is fixed to the handle shaft support portion 62a of the main frame 62 is disposed between a pair of left and right rods 82, 82. The electric handle lock device 85 actuates an electric motor incorporated therein to engage the lock part 116 (see FIG. 6A) with the top bridge 81 and thereby lock the turning of the handle 21. That is, the handle is locked.

The steering shaft upper arm 83 is fastened to the upper end portion of the front wheel steering shaft 12a by a bolt 86 and a nut 87, and is integrally formed with a pair of left and right steering arms 83a, 83a at the upper portion of the steering shaft upper arm 83, the left and right steering arms 83a, 83a extending obliquely upwardly and outwardly in the vehicle width direction. The left and right steering arms 83a, 83a are coupled to front end portions of the left and right rods 82, 82.

Figure 5:
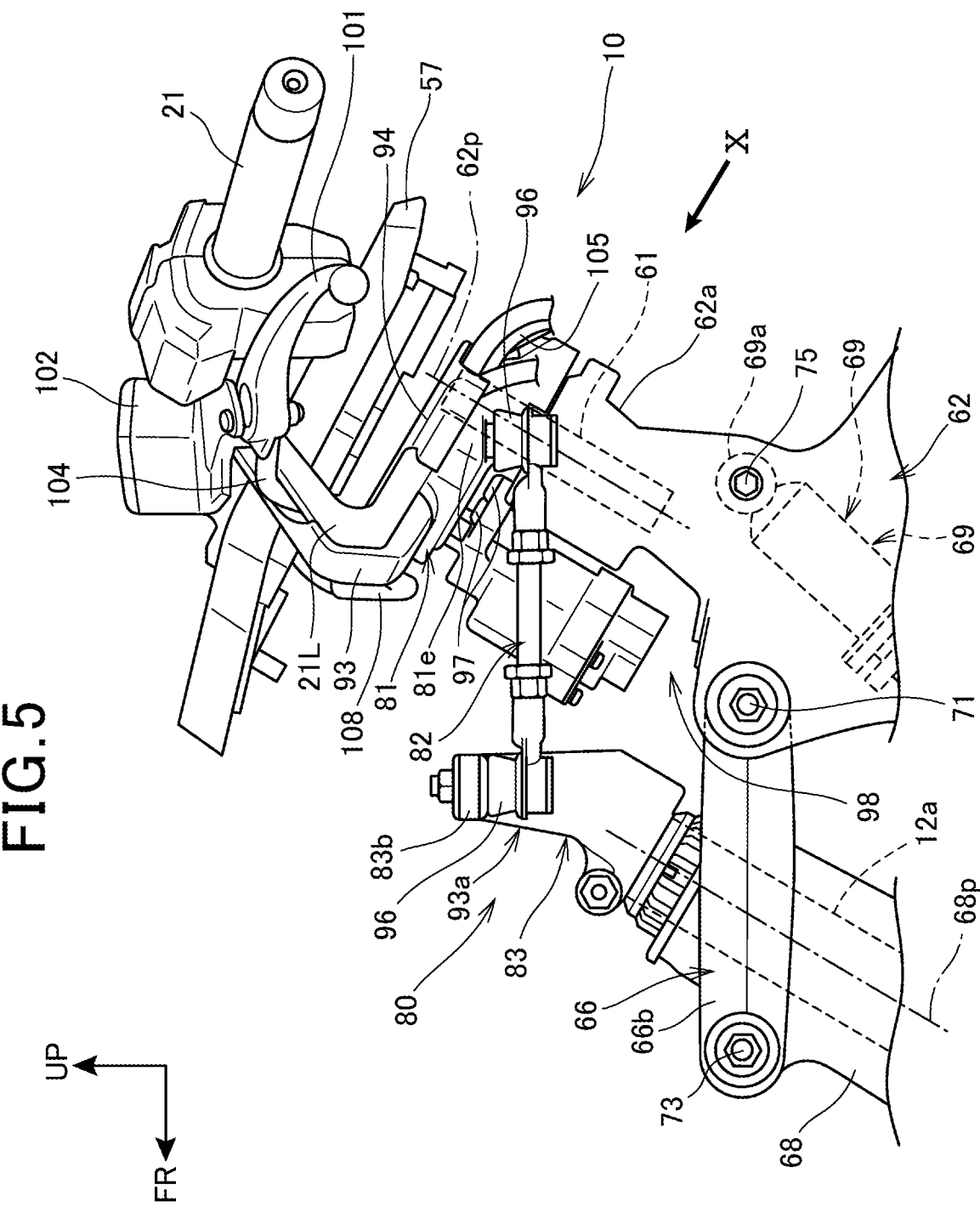
FIG. 5 is a left side elevational view illustrating the bar handle and the periphery thereof.

FIG. 5 is a left side elevational view illustrating the handle 21 and the periphery thereof.

An axis 62p of a handle shaft insertion hole 62d (see FIG. 12) into which the handle steering shaft 61 is inserted, in the main frame 62, and an axis 68p of the fork shaft insertion hole 68d (see FIG. 12) into which the front wheel steering shaft 12a is inserted, in the fork support part 68 are both inclined backwardly, and are disposed to be parallel to each other.

An upper end portion 69a of the front cushion unit 69 is coupled to the center portion of the main frame 62 in the vehicle width direction through the support shaft 75 in a swingable manner.

A portion of oblong components (hereinafter referred to as "long components") such as a clutch pipe 104, a brake pipe 108, and a harness 105 of an electrical component that are disposed along the handle 21 and the top bridge 81 is covered with a bridge cover 94 that covers a pair of left and right handle covers 93 that are provided at the handle half bodies 21L, 21R and a top surface of the top bridge 81. It is to be noted that, to facilitate understanding of the arrangement, the brake pipe 108 is exposed to the outside of the handle cover 93 (as for the correct arrangement, see FIG. 7).

Rods 82 are coupled to a left end portion 81e and a right end portion 81f of the top bridge 81 (as for the right end portion 81f, see FIG. 9A) and end portions 83b of the left and right steering arms 83a of the steering shaft upper arm 83, the left end portion 81e and the right end portion 81f being a left end and a right end of the top bridge 81, respectively. The rod 82 extends substantially horizontally in the front-rear direction, and both end portions of the rod 82 each are provided with a ball joint 96. The ball joints 96 at both ends of one of the rods 82 are coupled to the left end portion 81e of the top bridge 81 and the left end portion 83b of the steering shaft upper arm 83 in a swingable manner, respectively, and the ball joints 96 at both ends of the other are coupled to the right end portion 81f of the top bridge 81 and the right end portion 83b of the steering shaft upper arm 83 in a swingable manner, respectively.

In the electric handle lock device 85, the upper end portion thereof is fixed to the handle shaft support portion 62a of the main frame 62 by a pair of bolts 97, 97, and the lower portion is disposed to come closer to the handle shaft support portion 62a. The electric handle lock device 85 is disposed to come closer from the lower side to the top bridge 81. That is, the electric handle lock device 85 is disposed in a space 98 provided in front of the main frame 62 (the handle shaft support portion 62a, in particular) and below the top bridge 81, and overlaps with the rods 82 that extend in the front-rear direction in a side view. The above-described space 98 is a space between the handle shaft support portion 62a and the steering shaft upper arm 83 that is positioned in front of the handle shaft support portion 62a.

Figure 6A:
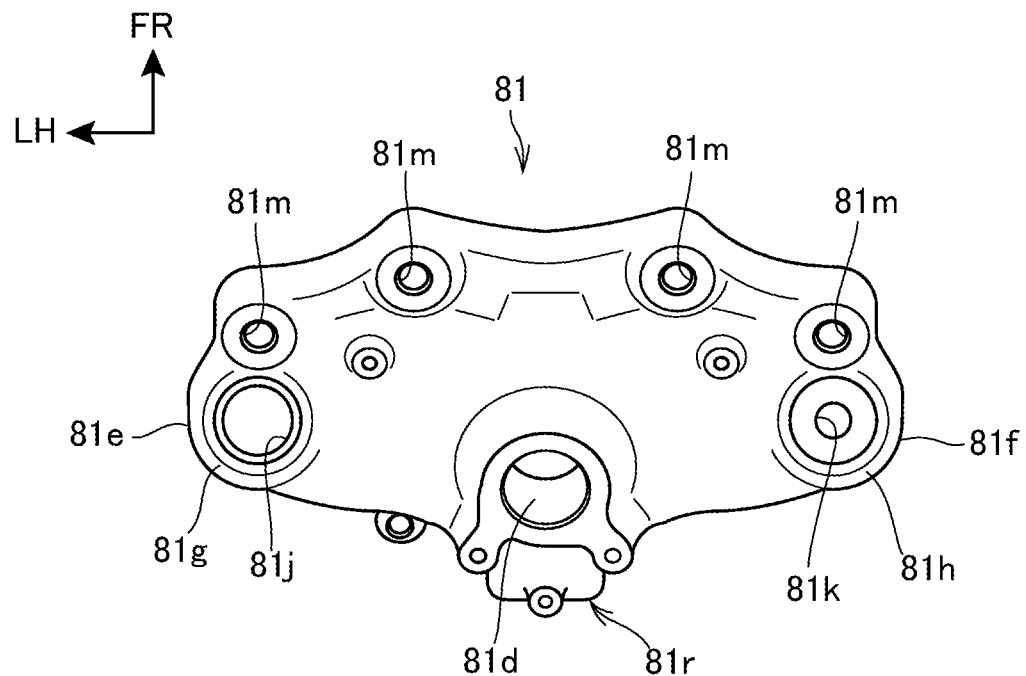
Figure 6B:
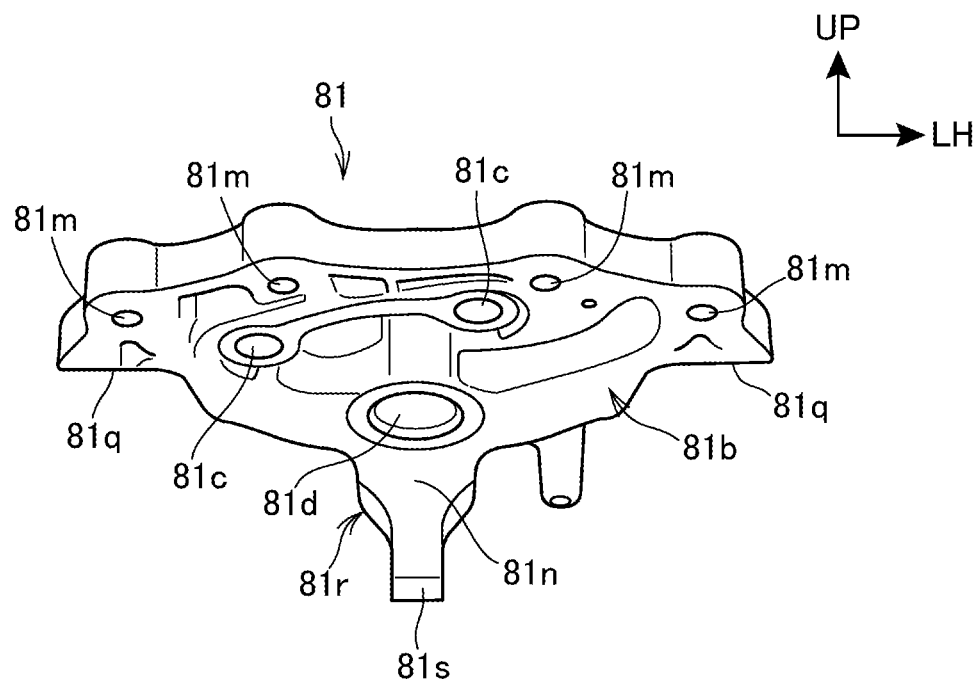

FIGS. 6A, 6B and 6C each are an explanatory diagram illustrating the top bridge 81.

FIG. 6A is a plan view illustrating the top bridge 81, and FIG. 6B is a left side elevational view illustrating the top bridge 81, and FIG. 6C is an elevational view illustrating the top bridge 81.

As illustrated in FIG. 6A, the top bridge 81 includes a shaft insertion hole 81d in a center portion in the vehicle width direction in a rear portion of the top bridge 81, rod coupling portions 81g, 81h that are formed to couple the left and right rods 82, 82 (see FIG. 4) in the left end portion 81e and the right end portion 81f, and a plurality of handle installation holes 81m in a front edge portion of the top bridge 81, respectively.

The shaft insertion hole 81d is a portion that is fastened with the upper end portion of the handle steering shaft 61 (see FIG. 3) that is inserted thereinto. Rod coupling holes 81j, 81k are opened in the rod coupling portions 81g, 81h, the rod coupling holes 81j, 81k being formed to insert bolts constituting the ball joints 96 (see FIG. 4) of the rods 82, 82 thereinto. The rod coupling holes 81j, 81k have different inner diameters to identify each of them.

The handle installation holes 81m have female screws for screwing in bolts 131, 132 (see FIG. 11) formed therein to attach the left and right handle half bodies 21L, 21R (see FIG. 7) thereto.

As illustrated in FIG. 6B, a pair of recess portions 81c, 81c are formed in a bottom surface 81b of the top bridge 81. The left and right recess portions 81c, 81c are not positioned symmetrically about an axis 81n of the shaft insertion hole 81d, and are formed at a right side in the vehicle width direction rather than a symmetrical position about the axis 81n. This is not because the handle 21 (see FIG. 7) has different left and right swing restriction angles, but this is because as illustrated in FIG. 7, the lock part 116 (see FIG. 9B) is disposed at a right side in the vehicle width direction rather than a center line of the vehicle body that passes the center of the vehicle in the vehicle width direction in a state where the electric handle lock device 85 (see FIG. 7) is attached to the main frame 62.

Figure 8:
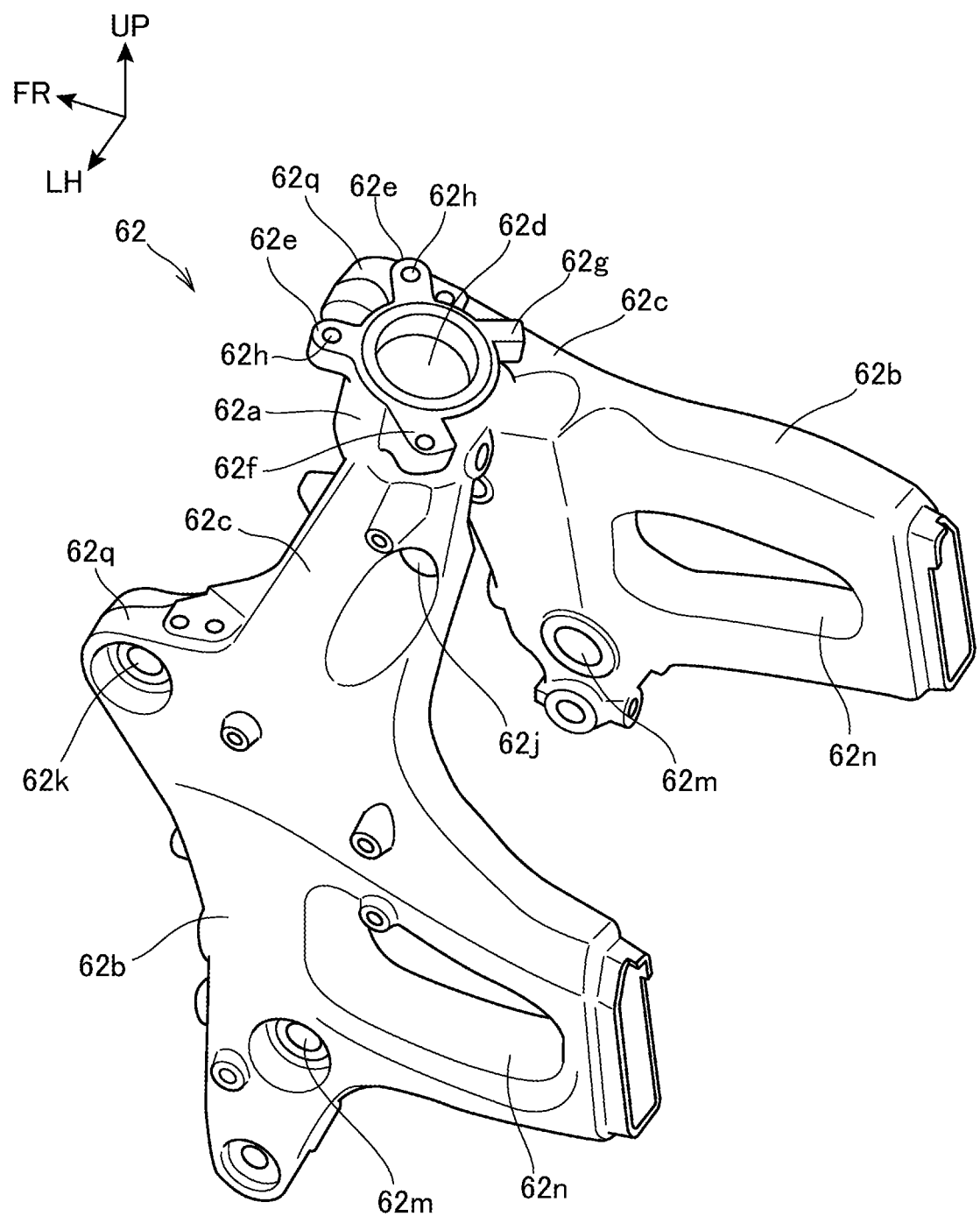
FIG. 8 is a perspective view illustrating a main frame as viewed from obliquely above.

The turning of a lower extension portion 81s is restricted by handle turning restricting portions 62f, 62g (see FIG. 8) of the main frame 62 (see FIG. 8). That is, when the lower extension portion 81s is in contact with the handle turning restricting portion 62f or the handle turning restricting portion 62g, the lock part 116 (see FIG. 9B) can be inserted into the recess portion 81c.

Figure 7:
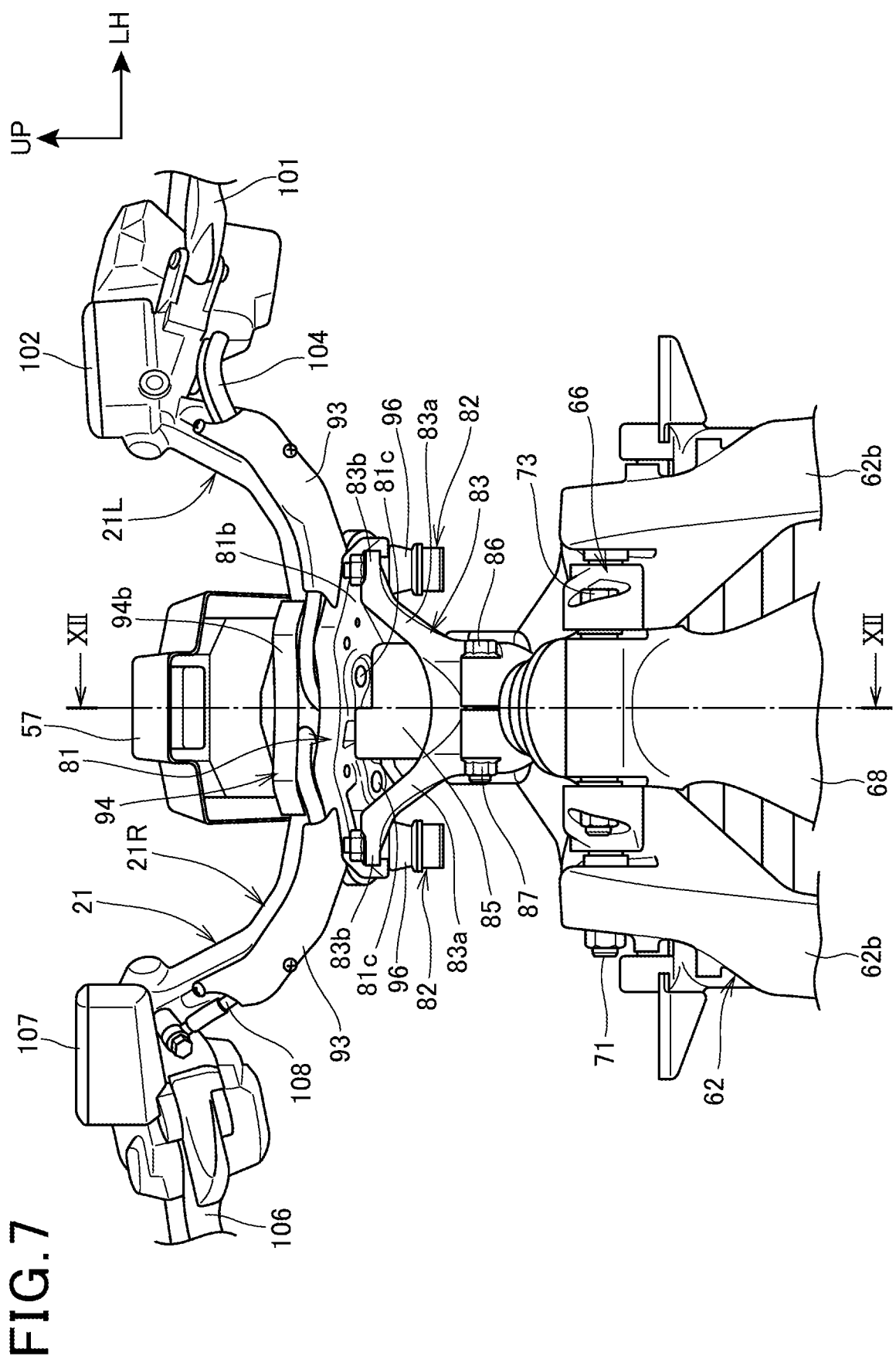
FIG. 7 is an elevational view illustrating the bar handle and the periphery thereof.

FIG. 7 is an elevational view illustrating the handle 21 and the periphery thereof.

The left side handle half body 21L of the handle 21 is provided with a clutch lever 101, and a clutch master cylinder 102 that generates hydraulic pressure in hydraulic fluid by operation of the clutch lever 101. The clutch master cylinder 102 is connected to a clutch pipe 104 to transmit operating hydraulic pressure generated in the clutch master cylinder 102 to the clutch on the transmission 23 (see FIG. 1) side through the clutch pipe 104.

The right side handle half body 21R is provided with a front brake lever 106, and a front brake master cylinder 107 that generates hydraulic pressure in brake fluid by operation of the front brake lever 106. The front brake master cylinder 107 is connected to a brake pipe 108 to transmit brake hydraulic pressure generated in the front brake master cylinder 107 to the front wheel disc brake device 64 (see FIG. 1) through the brake pipe 108.

The above-described clutch pipe 104 and the brake pipe 108 are disposed along the bottom surfaces of the handle half bodies 21L, 21R, respectively so as to extend toward the top surface side of the top bridge 81.

The top bridge 81 has a pair of recess portions 81c, 81c in the bottom surface 81b thereof, the recess portions 81c, 81c being formed to insert the lock part 116 (see FIGS. 6A and 6B) provided in the electric handle lock device 85 thereinto. The pair of recess portions 81c, 81c are formed at positions where the lock part 116 is inserted when the handle 21 is maximally turned leftward or rightward, respectively.

The top bridge 81 and the steering shaft upper arm 83 have the substantially same width in the vehicle width direction in a front view, and the electric handle lock device 85 is visible between the left and right steering arms 83a, 83a of the steering shaft upper arm 83.

The main frame 62 is provided with a pair of left and right side walls 62b, 62b at a front portion thereof. The left and right side walls 62b, 62b are formed so that a distance between the left and right side walls 62b, 62b is gradually increased toward a lower side, and the upper link 66 is coupled to the upper end portions of the side walls 62b, 62b.

FIG. 8 is a perspective view illustrating the main frame 62 as viewed from obliquely above.

The main frame 62 is integrally formed from the cylindrical handle shaft support portion 62a, a pair of left and right inclined walls 62c, 62c, and a pair of left and right side walls 62b, 62b.

The handle shaft support portion 62a turnably supports the handle steering shaft 61 (see FIG. 3). The left and right inclined walls 62c, 62c extend outwardly and obliquely downwardly from left and right of the handle shaft support portion 62a, respectively. The left and right side walls 62b, 62b extend downwardly and obliquely outwardly from the lower ends of the left and right inclined walls 62c, 62c, respectively so that the left and right side walls 62b, 62b are roughly vertical compared to the inclined walls 62c, 62c.

The handle shaft support portion 62a includes the handle shaft insertion hole 62d into which the handle steering shaft 61 (see FIG. 5) is inserted, a pair of left and right lock device support portions 62e, 62e that are formed at a front side of the upper end portion of the handle shaft support portion 62a, and a pair of left and right handle turning restricting portions 62f, 62g that are formed at a rear side of the upper end portion of the handle shaft support portion 62a.

In the left and right lock device support portions 62e, 62e, bolt holes 62h are opened, the bolt holes having female screws for screwing in bolts 97 (see FIG. 5) formed therein, respectively. A left installation portion 112c and a right installation portion 112d of the electric handle lock device 85 illustrated in FIG. 9B are fastened to the lock device support portions 62e, 62e with bolts 97, respectively.

In FIG. 8, the handle turning restricting portions 62f, 62g are parts for restricting the maximum leftward and rightward turning angle of the handle 21 (see FIG. 7). When the handle 21 is turned rightwardly or leftwardly, the lower extension portion 81s (see FIG. 6B) formed in the top bridge 81 (see FIG. 7) is in contact with the handle turning restricting portion 62f or the handle turning restricting portion 62g, thereby restricting turning of the handle 21.

The inclined walls 62c, 62c and the side walls 62b, 62b are formed in a hollow structure, and an opening 62n is formed in each of the side walls 62b, 62b, to thereby reduce a weight of the main frame 62. A cushion support shaft insertion hole 62j is formed in the inclined walls 62c, 62c, the cushion support shaft insertion hole 62j being formed to insert the support shaft 75 (see FIG. 5) for supporting the upper end portion 69a (see FIG. 5) of the front cushion unit 69 (see FIG. 5). A forward protrusion wall portion 62q that protrudes forwardly than each of the inclined walls 62c, 62c and link support shaft insertion holes 62k, 62m into which the support shafts 71, 72 (see FIG. 3) are inserted respectively are formed in the front upper portion of each of the side walls 62b, 62b, and the link support shaft insertion hole 62k is opened in the forward protrusion wall portion 62q.

Figure 9A:
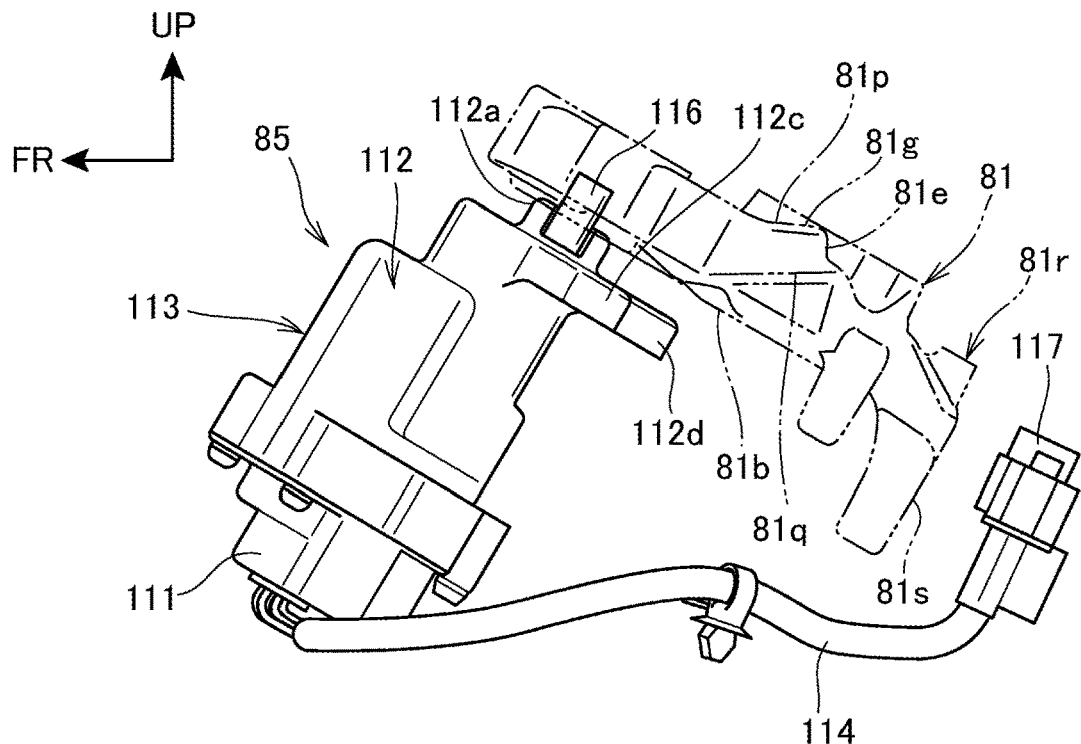
Figure 9B:
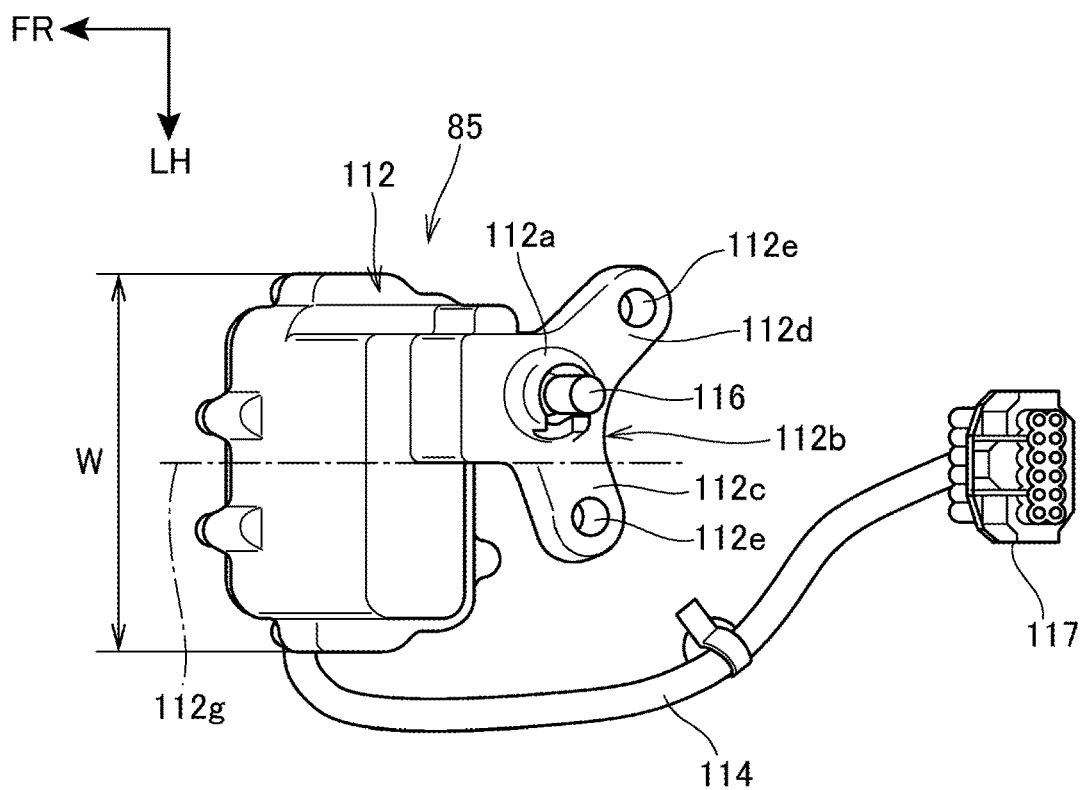

FIGS. 9A and 9B each are an explanatory diagram illustrating the electric handle lock device 85.

FIG. 9A is a left side elevational view illustrating the top bridge 81 and the electric handle lock device 85, and FIG. 9B is a plan view illustrating the electric handle lock device 85.

As illustrated in FIG. 9A, in each of the left and right rod coupling portions 81g, 81h (as for the rod coupling portion 81h, see FIG. 6A) in the top bridge 81, a top surface 81p and a bottom surface 81q thereof are formed substantially horizontally to easily attach the vertically extending bolt provided at a ball joint 96 (see FIG. 5) of the rod 82 (see FIG. 5) that extends in the front-rear direction.

A rear protrusion portion 81r is integrally formed to protrude backwardly from a rear end of the top bridge 81, and the lower extension portion 81s is formed in a direction substantially perpendicular to the bottom surface 81b of the top bridge 81 to extend downwardly in the rear protrusion portion 81r. The lower extension portion 81s is a portion in which the turning is restricted by the handle turning restricting portions 62f, 62g of the main frame 62 illustrated in FIG. 8.

The electric handle lock device 85 includes a lock device case 113 including a lower case 111 and an upper case 112, a harness 114 that is connected to the lower case 111, and a rod-shaped lock part 116 capable of protruding or retracting with respect to the upper case 112.

The lock device case 113 incorporates an electric motor, and a rotary shaft of the electric motor is connected to the lock part 116 through a gear. The upper case 112 includes a raised portion 112a that protrudes upwardly from the upper end portion of the upper case 112, and a lock device installation portion 112b to be attached to the main frame 62 (see FIG. 5).

The harness 114 includes a plurality of conductive wires used to apply an electric current to the electric motor from the outside, and a connector 117 is connected to end portions of the conductive wires.

It is to be noted that the electric handle lock device 85 is not limited to a device driven by the above-described electric motor, and may be a device driven by a solenoid.

As illustrated in FIG. 9B, the lock part 116 protrudes from a right side of a case center line 112g that passes a center of a width W of the upper case 112 in the vehicle width direction, and the raised portion 112a is formed on the upper end portion of the upper case 112 so as to surround the periphery of the lock part 116. The lock device installation portion 112b of the upper case 112 includes a left installation portion 112c and a right installation portion 112d that bifurcately extend integrally and backwardly from the raised portion 112a side on the upper end portion of the upper case 112, and bolt insertion holes 112e each for passing the bolt 97 (see FIG. 5) are opened in each of the left installation portion 112c and the right installation portion 112d.

In FIG. 6C and FIGS. 9A and 9B, when a passenger presses a button provided in an FOB electronic key, and an electric current is applied to the electric motor from the outside by a remote control, the rotary shaft of the electric motor rotates in one direction, and the lock part 116 protrudes from the upper case 112 to be engaged with one of the recess portions 81c, 81c in the top bridge 81. That is, the handle is locked. When the electric current is applied to the electric motor, and the rotary shaft rotates in another direction, the lock part 116 retracts toward the upper case 112 side to release the engagement with the recess portion 81c in the top bridge 81. That is, the handle lock is released.

FIG. 10 is a diagram as viewed from an arrow direction of X of FIG. 5, and as viewed in a vertical direction to a longitudinal direction of the handle steering shaft 61 in FIG. 5.

The handle half bodies 21L, 21R of the handle 21 are integrally provided with a left straight portion 21c and a right straight portion 21d, respectively, each of the left straight portion 21c and the right straight portion 21d extending outwardly and obliquely backwardly from the upper end portion of the inclined portion 21a. The left straight portion 21c includes a left switch case 121 provided with a plurality of switches, and a handle grip 122 to be gripped by a driver. The right straight portion 21d includes a right switch case 123 provided with a plurality of switches, and a throttle grip 124 to be gripped by a driver to adjust throttle opening.

The support shaft 75 penetrates through the left and right inclined walls 62c, 62c in the vicinity of the root portions in the main frame 62, and the upper end portion 69a of the front cushion unit 69 is coupled to the support shaft 75.

The bridge cover 94 is integrally formed from an upper wall 94a, a front wall 94b (see FIG. 7), and a rear wall 94c that cover a top surface, a front surface, and bottom surface of the top bridge 81, respectively.

A pair of left and right notches 94d, 94d are formed in the rear wall 94c so that long components 130A, 130B extend backwardly and downwardly from the notches 94d, 94d to the top surface of the top bridge 81. The long components 130A, 130B will be described in detail with reference to FIG. 11.

FIG. 11 is a plan view of a main part illustrating the handle 21 and the periphery thereof.

The clutch pipe 104 and the harnesses extending from a switch (not illustrated) for detecting operation or non-operation of the clutch lever 101 as turning on or off extend along the left side handle half body 21L of the handle 21, and the harness extends from the meter panel 52. Long components 130A such as the clutch pipe 104 and a bundle of various harnesses extend on the top surface of the top bridge 81 obliquely rightwardly and backwardly from a left front side.

The brake pipe 108 and the harnesses 109 extending from a switch (not illustrated) for detecting operation or non-operation of the front brake lever 106 as turning on or off, and the harnesses connected to an engine start switch and a kill switch extend along the right side handle half body 21R of the handle 21. Long components 130B such as the brake pipe 108 and a bundle of various harnesses extend on the top surface of the top bridge 81 obliquely leftwardly and backwardly from a right front side.

That is, the long components 130A and the long components 130B cross to form an X-shape on a top surface of the top bridge 81, and the long components 130A and the long components 130B are fixed to the top bridge 81 by a fixing member (not illustrated).

Thus, the long components 130A and the long components 130B cross to form an X-shape on the top bridge 81 so that the curvature radius of bend of the long components 130A and the long components 130B can be greater. Therefore, no unreasonable force is applied to the long components 130A and the long components 130B so that the long components 130A and the long components 130B can be hard to deteriorate. Furthermore, spaces 133 above the top bridge 81, more particularly, a recessed space 133 between the handle half bodies 21L, 21R can be effectively utilized, thereby capable of reducing protrusion amounts of the long components 130A and the long components 130B that protrude upwardly from the handle half bodies 21L, 21R.

The upper wall 94a of the bridge cover 94 covers, from above, the long components 130A and the long components 130B, the top surface of the top bridge 81 including the rod coupling portions 81g, 81h of the top bridge 81, bolts 131 of a pair of bolts 131, 132 for fixing the handle half bodies 21L, 21R to the top bridge 81, the bolts 131 being provided at a center side in the vehicle width direction, and the periphery of the bolts 131.

Figure 12:
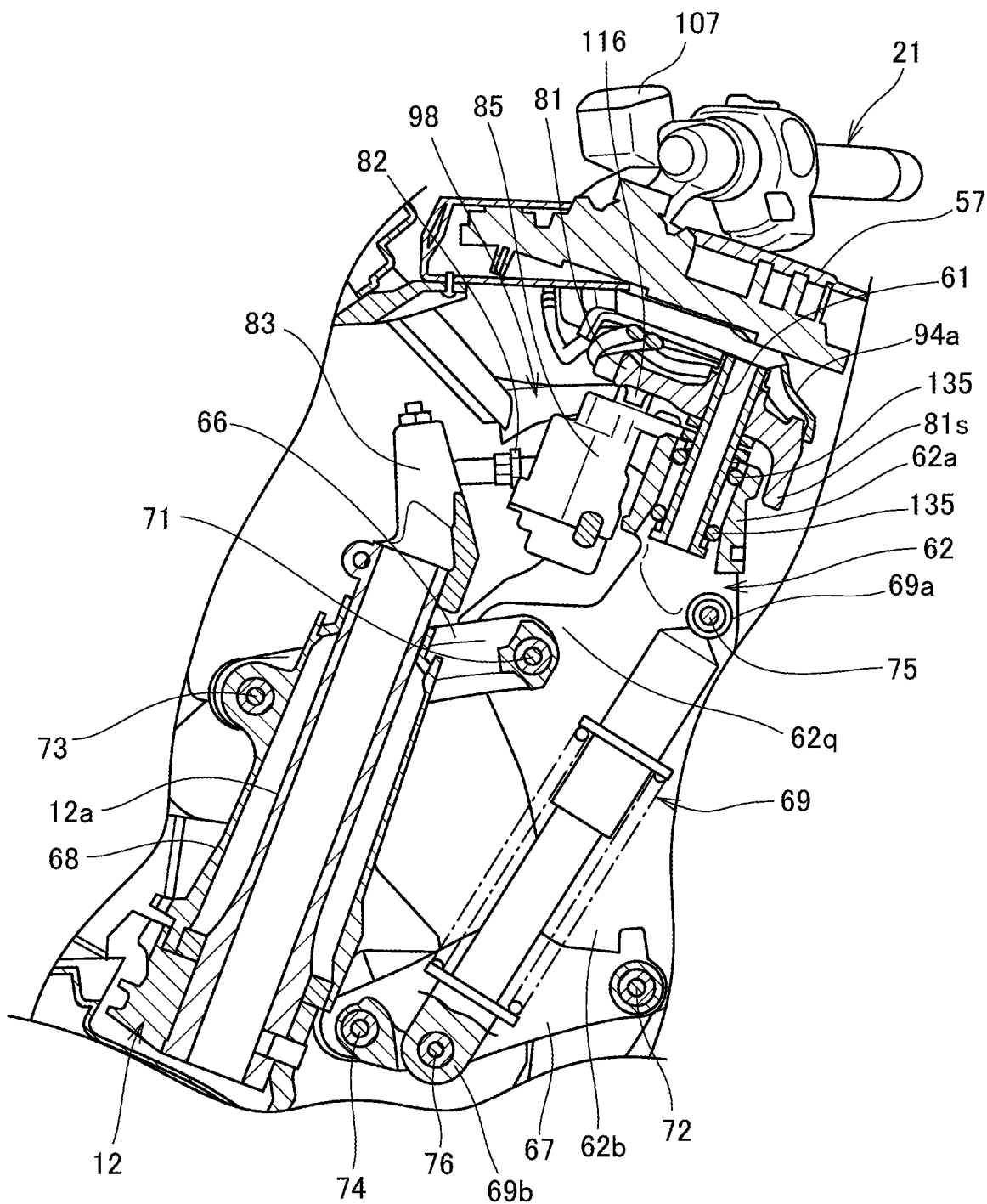
FIG. 12 is a left side cross-sectional view taken along line XII-XII of FIG. 7.

FIG. 12 is a left side cross-sectional view taken along line XII-XII of FIG. 7.

The handle shaft support portion 62a is provided at the upper portion of the main frame 62, a hollow handle steering shaft 61 is turnably supported on the handle shaft support portion 62a through a pair of bearings 135, 135, and the top bridge 81 is attached to the upper end portion of the handle steering shaft 61.

The rear end portions of the upper link 66 and the lower link 67 are swingably coupled to the front end portions of the pair of left and right side walls 62b of the main frame 62 through the support shafts 71, 72, respectively. The hollow fork support part 68 is swingably coupled to the front end portions of the upper link 66 and the lower link 67 through the support shafts 73, 74, respectively.

The front wheel steering shaft 12a of the front swing arm 12 is turnably supported on the fork support part 68 through a pair of upper and lower bearings (not illustrated).

Both end portions of the top bridge 81 are coupled to both end portions of the steering shaft upper arm 83 attached to the upper end portion of the front wheel steering shaft 12a through the pair of left and right rods 82.

The upper end portion 69a of the front cushion unit 69 is turnably coupled to the main frame 62 through the support shaft 75, and the lower end portion 69b of the front cushion unit 69 is turnably coupled to an intermediate portion of the lower link 67 through the support shaft 76.

The electric handle lock device 85 is fixed to the upper end portion of the handle shaft support portion 62a of the main frame 62.

The electric handle lock device 85 is disposed in the space 98 formed in front of the handle shaft support portion 62a of the main frame 62 and the handle steering shaft 61, below the top bridge 81, above the side wall 62b of the main frame 62 (the forward protrusion wall portion 62q, in particular), above the upper link 66, behind the front wheel steering shaft 12a, and behind the steering shaft upper arm 83 in a side view. Furthermore, the electric handle lock device 85 is disposed above the front cushion unit 69.

As illustrated in FIG. 11 and FIG. 12 described above, the electric handle lock device 85 and the long components 130A, 130B are compactly disposed to come closer to the periphery of the top bridge 81, thereby achieving miniaturization of the periphery of the handle 21, and hence the vehicle body front portion.

In addition to the above-described peripheral components of the electric handle lock device 85, the left and right rods 82, 82 covers the electric handle lock device 85 from their sides, thereby capable of protecting the electric handle lock device 85.

As illustrated above in FIG. 3 and FIG. 5, in the handle lock structure for the motorcycle 10 (see FIG. 1) as a saddled vehicle including: the handle steering shaft 61 operated by the handle 21; the front wheel steering shaft 12a disposed to steer the front wheel 13 in front of the handle steering shaft 61; the top bridge 81 which is fastened to the upper end of the handle steering shaft 61 and to which the handle 21 is fixed; and the electric handle lock device 85 that is electrically operated and is provided in the proximity of the handle 21, the electric handle lock device 85 is provided between the handle steering shaft 61 and the front wheel steering shaft 12a, and the electric handle lock device 85 is disposed so that at least part thereof overlaps below the top bridge 81 in a plan view.

According to the above-described configuration, the electric handle lock device 85 can be disposed in a space 98 between the handle steering shaft 61 and the front wheel steering shaft 12a that are disposed in a front-rear direction, the space 98 being disposed below the top bridge 81 to come closer to the handle steering shaft 61 side. Therefore, a compact arrangement around the handle 21, more particularly, around the top bridge 81 can be provided to thereby achieve miniaturization of the vehicle body front portion.

The front wheel steering shaft 12a is coupled to the handle steering shaft 61 through rods 82, 82 as a pair of left and right link members that are coupled to the top bridge 81, and the electric handle lock device 85 is disposed between the pair of left and right rods 82, 82 so as to overlap with the pair of left and right rods 82, 82 in a side view, thereby disposing the electric handle lock device 85 in the space 98 between the pair of left and right rods 82, 82 so that the space 98 can be effectively utilized. Therefore, the electric handle lock device 85 can be disposed intensively around the handle 21, thereby capable of providing a compact arrangement around the handle 21. In addition, the electric handle lock device 85 can be protected from their sides by the left and right rods 82, 82, without specially providing members for protecting the electric handle lock device 85. Accordingly, the number of components can be prevented from being increased, thereby reducing the cost.

As illustrated in FIG. 4 and FIG. 5, the steering shaft upper arm 83 is provided at the upper end portion of the front wheel steering shaft 12a, both end portions of the steering shaft upper arm 83 are coupled to the pair of left and right rods 82, 82, respectively, and the electric handle lock device 85 is disposed behind the steering shaft upper arm 83, thereby disposing the electric handle lock device 85 in a space 98 in front of the main frame 62 and behind the steering shaft upper arm 83 so that the space 98 can be effectively utilized, and capable of protecting the electric handle lock device 85 by the steering shaft upper arm 83.

As illustrated in FIG. 5 and FIGS. 6A and 6B, since the electric handle lock device 85 is provided with the lock part 116 that is engaged with the bottom surface of the top bridge 81 to be capable of restricting turning of the handle 21, the lock part 116 is engaged with the top bridge 81 to restrict a turning position of the handle 21, thereby capable of increasing the degree of freedom of arrangement of the electric handle lock device 85 in the present embodiment as compared with a conventional handle lock device whose arrangement is restricted to around a head pipe.

As illustrated in FIGS. 6A and 6B and FIG. 7, the lock part 116 can be engaged with the recess portion 81c that is formed on the bottom surface of the top bridge 81, thereby enabling the electric handle lock device 85 to be disposed to come closer from the lower side to the top bridge 81. Accordingly, the electric handle lock device 85 can be disposed intensively around the top bridge 81, thereby capable of providing a compact arrangement around the handle 21.

As illustrated in FIG. 5, the main frame 62 turnably supports the handle steering shaft 61, and the electric handle lock device 85 is supported on an upper portion of the main frame 62, and disposed to come closer to a front of the main frame 62, thereby capable of efficiently utilizing a space 98 formed below the top bridge 81 and in front of the main frame 62 to dispose the electric handle lock device 85, and providing a compact arrangement around the top bridge 81.

As illustrated in FIG. 8, the main frame 62 is provided with the handle turning restricting portions 62f, 62g as restricting portions for restricting a turning angle of the handle 21, and the lock device support portions 62e, 62e as support portions for supporting the electric handle lock device 85, the handle turning restricting portions 62f, 62g are provided in an opposite side to the lock device support portions 62e, 62e with respect to the handle steering shaft 61, so that the lock device support portions 62e, 62e and the handle turning restricting portions 62f, 62g can be disposed to come closer to the handle steering shaft 61, thereby capable of being disposed intensively around the handle 21 and providing a compact arrangement around the handle 21.

The handle turning restricting portions 62f, 62g are integrally formed with the main frame 62, thereby capable of reducing the number of components and the cost.

As illustrated in FIG. 11, since the long components 130A, 130B such as pipes, and harnesses that are connected to components attached to the handle 21 cross to form an X-shape on a top surface of the top bridge 81, and the long components 130A, 130B are fixed to the top bridge 81, the long components 130A, 130B are disposed on the top surface of the top bridge 81, thereby capable of effectively utilizing a space 133 close to the top bridge 81. Accordingly, the components can be disposed intensively around the handle 21, thereby capable of providing a compact arrangement around the handle 21. The long components 130A, 130B cross to form an X-shape, so that the curvature radius of bend of the long components 130A, 130B can be greater.

Therefore, the long components 130A, 130B can be reasonably disposed, so that the long components 130A, 130B can be hard to deteriorate.

As illustrated in FIG. 5 and FIG. 12, the front cushion unit 69 the upper end portion 69a of which is supported on the main frame 62 is disposed below the electric handle lock device 85, thereby capable of covering the electric handle lock device 85 by the front cushion unit 69 from below to protect the electric handle lock device 85 from flying stone or the like.

The above-described embodiment is definitely an aspect of the present invention and can arbitrarily be altered and applied without departing the spirit of the present invention.

For example, in the above-described embodiment, as illustrated in FIG. 5, in the main frame 62, the lock device support portions 62e, 62e are provided at a front side of the handle shaft support portion 62a, and the handle turning restricting portions 62f, 62g are provided at a rear side of the handle shaft support portion 62a, but a configuration of the main frame 62 is not limited to this configuration. The handle turning restricting portions 62f, 62g may be provided at the front side of the handle shaft support portion 62a, and the lock device support portions 62e, 62e may be provided at the rear side of the handle shaft support portion 62a, and thereby the electric handle lock device 85 may be disposed at a rear side of the handle shaft support portion 62a.

The present invention is not limited to the application to the motorcycle 10, and can be also applied to saddled vehicles other than the motorcycle 10. It is to be noted that a saddled vehicle includes general vehicles which allows the drivers to ride astride the vehicle bodies, and includes not only the automotive two-wheeled vehicles (including a motorized bicycle), but also three-wheeled vehicles or four-wheeled vehicles categorized as ATV (rough-terrain traveling vehicles).

REFERENCE SIGNS LIST 10 motorcycle (saddled vehicle)
12 front swing arm
12a front wheel steering shaft
13 front wheel
14 rear swing arm
21 handle
61 handle steering shaft
62 main frame
62e lock device support portion (support portion)
62f, 62g handle turning restricting portion (restricting portion)
69 front cushion unit (cushion unit)
81s lower extension portion of top bridge
81 top bridge
81c recess portion
82 rod (link member)
83 steering shaft upper arm
85 electric handle lock device
112b lock device installation portion (support portion)
116 lock part
130A long component (104 clutch pipe, 105 harness)
130B long component (108 brake pipe, 109 harness)

The invention claimed is:

1. A handle lock structure for a saddled vehicle, comprising:
a handle steering shaft operated by a handle;
a front wheel steering shaft disposed to steer a front wheel, said front wheel steering shaft being in front of the handle steering shaft;
a top bridge, said top bridge being is fastened to an upper end of the handle steering shaft, said handle being fixed to the top bridge; and
an electric handle lock device that is electrically operated and is provided in proximity to the handle, wherein
the electric handle lock device is provided between the handle steering shaft and the front wheel steering shaft and is disposed so that at least part of the electric handle lock device is disposed under the top bridge when the top bridge is seen in a vertical direction from an upper side of the top bridge,
a main frame supports the electric handle lock device, the main frame includes a handle shaft support portion that turnably supports the handle steering shaft, and the top bridge is disposed above the handle shaft support portion,
the front wheel steering shaft is coupled to the handle steering shaft by left and right link members that are coupled to the top bridge and that extend forwardly from the top bridge,
the left and right link members are coupled to a left end portion and a right end portion of the top bridge, respectively, the left end portion and the right end portion being a left end and a right end of the top bridge, respectively,
the electric handle lock device is disposed between the left and right link members and the electric handle lock device overlaps with the left and right link members when the electric handle lock device is seen in a horizontal direction.

2. The handle lock structure for a saddled vehicle according to claim 1, wherein
the front wheel steering shaft is coupled to the handle steering shaft through left and right link members that are coupled to the top bridge, and the electric handle lock device is disposed between the left and right link members so as to overlap with the left and right link members when the electric handle lock device is seen in the horizontal direction.

3. The handle lock structure for a saddled vehicle according to claim 2, wherein
a steering shaft upper arm is provided at an upper end portion of the front wheel steering shaft, each end of the steering shaft upper arm has an end portion, and both of the end portions of the steering shaft upper arm are coupled to respective ones of the left and right link members, so that the electric handle lock device is disposed behind the steering shaft upper arm.

4. The handle lock structure for a saddled vehicle according to claim 1, wherein
the electric handle lock device is provided with a lock part that is engaged with a bottom surface of the top bridge to be capable of restricting turning of the handle.

5. The handle lock structure for a saddled vehicle according to claim 4, wherein
the lock part is engageable with a recess portion that is formed on the bottom surface of the top bridge.

6. The handle lock structure for a saddled vehicle according to claim 1, wherein
the electric handle lock device is disposed in a vicinity of a front of the main frame.

7. The handle lock structure for a saddled vehicle according to claim 6, wherein
the main frame includes restricting portions that restrict a turning angle of the handle, and support portions that support the electric handle lock device, and the restricting portions are provided in an opposite side to the support portions with respect to the handle steering shaft.

8. The handle lock structure for a saddled vehicle according to claim 7, wherein
the restricting portions are integrally formed with the main frame.

9. The handle lock structure for a saddled vehicle according to claim 1, wherein
components are attached to the handle, long components that are connected to the components attached to the handle cross to form an X-shape on a top surface of the top bridge, and the long components are fixed to the top bridge.

10. The handle lock structure for a saddled vehicle according to claim 1, wherein
a cushion unit is disposed below the electric handle lock device so that an upper end portion of the cushion unit is supported on the main frame.

11. A handle lock structure for a saddled vehicle, comprising:
a handle steering shaft operated by a handle;
a front wheel steering shaft disposed to steer a front wheel in front of the handle steering shaft;
a top bridge, said top bridge being is fastened to an upper end of the handle steering shaft, said handle being fixed to the top bridge; and
an electric handle lock device that is electrically operated and is provided in proximity to the handle, wherein
the electric handle lock device is provided between the handle steering shaft and the front wheel steering shaft, and the electric handle lock device is disposed so that at least part of the electric handle lock device is disposed under the top bridge when the top bridge is seen in a vertical direction from an upper side of the top bridge,
a main frame is provided to turnably support the handle steering shaft, and the electric handle lock device is supported on an upper portion of the main frame and is disposed in a vicinity of a front of the main frame,
the main frame includes restricting portions that restrict a turning angle of the handle, and support portions that support the electric handle lock device, and the restricting portions are provided in an opposite side to the support portions with respect to the handle steering shaft.

12. A handle lock structure for a saddled vehicle, comprising:
a handle steering shaft operated by a handle;
a front wheel steering shaft disposed to steer a front wheel in front of the handle steering shaft;
a top bridge, said top bridge being is fastened to an upper end of the handle steering shaft, said handle being fixed to the top bridge;
an electric handle lock device that is electrically operated and is provided in proximity to the handle; and,
a main frame that supports the electric handle lock device, wherein
the electric handle lock device is provided between the handle steering shaft and the front wheel steering shaft, and the electric handle lock device is disposed so that at least part of the electric handle lock device is disposed under the top bridge when the top bridge is seen in a vertical direction from an upper side of the top bridge, and
a cushion unit is disposed below the electric handle lock device so that an upper end portion of the cushion unit is supported on the main frame.

* * * * *